United States Patent [19]

Tsutsumi

[11] 4,159,495
[45] Jun. 26, 1979

[54] OPENING AND CLOSING DEVICE FOR CASSETTE HOLDER OF TAPE RECORDER OR THE LIKE

[75] Inventor: Kazumasu Tsutsumi, Hamamatsu, Japan

[73] Assignee: Nippon Gakki Seizo Kabushiki Kaisha, Hamamatsu, Japan

[21] Appl. No.: 908,000

[22] Filed: May 22, 1978

[30] Foreign Application Priority Data

| May 24, 1977 | [JP] | Japan | 52/66865[U] |
| May 25, 1977 | [JP] | Japan | 52/67165[U] |
| May 27, 1977 | [JP] | Japan | 52/68393[U] |
| Jun. 28, 1977 | [JP] | Japan | 52/85263[U] |

[51] Int. Cl.² .................. G11B 23/04; G11B 23/02
[52] U.S. Cl. .................................. 360/137; 360/96.5
[58] Field of Search ........................ 360/137, 93–96

[56] References Cited

U.S. PATENT DOCUMENTS

| 3,655,924 | 4/1972 | Puskas | 360/137 |
| 3,800,323 | 3/1974 | Jenkins | 360/96 |
| 3,818,504 | 6/1974 | Schroeder | 360/96 |
| 3,945,039 | 3/1976 | Yoshii | 360/137 |

OTHER PUBLICATIONS

Advertisement for Dual 901 Cassette Deck, stamped 8/1/1975.
Advertisement for Nakamichi 700, Cassette Deck.

*Primary Examiner*—Jay P. Lucas
*Attorney, Agent, or Firm*—Kane, Dalsimer, Kane, Sullivan & Kurucz

[57] ABSTRACT

A cassette tape recorder that incorporates an opening and closing device for a cassette holder or the like. The opening and closing device comprises a rotating member which is rotated in accordance with opening and closing operations of the cassette holder so as to lock the holder in its closed state and to give a damping effect on the opening movement of the holder. The force for opening the cassette holder as well as the force for holding the same in the closed state is provided by the actuating force of a single actuator.

14 Claims, 10 Drawing Figures

OPENING AND CLOSING DEVICE FOR CASSETTE HOLDER OF TAPE RECORDER OR THE LIKE

BACKGROUND OF THE INVENTION

The present invention relates to an opening and closing device for a cassette holder or the like in a cassette tape recorder.

It has heretobefore been proposed to provide a cassette holder mounted in a cassette tape recorder which is constructed such that when closing a cassette holder in which a cassette has been inserted, the cassette is ready to be played, while after completion of playing it is removed from the cassette holder by depressing an ejection push button.

Figure 1:
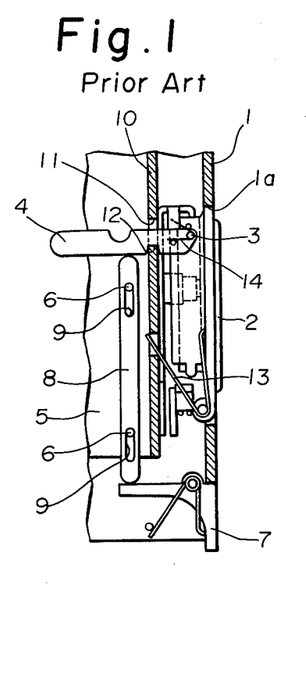
FIG. 1 is a side view of an opening and closing device for a cassette holder mounted in a cassette tape recorder according to prior art, showing the cassette holder kept in a closed position.
Figure 2:
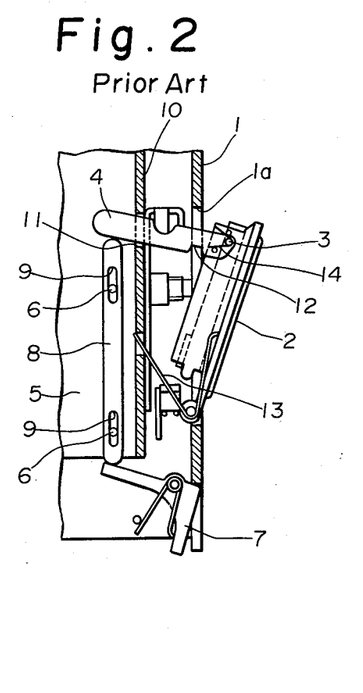
FIG. 2 is a side view of the device in FIG. 1, showing the cassette holder in an opened position.

FIG. 1 and FIG. 2 illustrate an example of the hitherto known cassette holder which is constructed in the above-mentioned manner. As shown in the drawings, a cassette holder 2 is mounted in an opening 1a of a front pannel 1 of the tape recorder in such a manner that the cassette holder can be tilted about the lower portion thereof as a center of rotation. On the upper part of the cassette holder 2 there is provided a swing lever 4 which is arranged rotatably around a pin 3 on the holder 2. Further a lift lever 8 to be actuated by the ejection button 7 is arranged vertically displaceably with the aid of pins 6 secured to a chassis 5 and elongated holes 9 through which the pins 6 extend. The swing lever 4 extends through an insert hole 11 in the side wall 10 of the casing of the device in such a manner that the lower surface thereof comes in sliding contact with the top end of the lift lever 8. Further the swing lever 4 is provided with an engagement recess 12 on the lower surface thereof, with which the lower edge of the side wall 10 in the insert hole 11 comes in engagement. It is to be noted that the cassette holder 2 is always biased in the opening direction with the aid of a spring 13, while the swing lever 4 is always biased in the counterclockwise direction by means of spring 14.

When the cassette holder 2 is kept closed, as shown in FIG. 1, the swing lever 4 is engaged at its recess 12 to the lower edge of the side wall 10 in the insert aperture 11, which prevents the cassette holder 2 from being opened by means of spring force of the spring 13. When it is desired to open the cassette holder 2, the ejecting button 7 is depressed, causing the lift lever 8 to be raised. As the lift lever is raised, the swing lever 4 is rotated around the pin 3 as a center of rotation in the clockwise direction, till the recess 12 is disengaged from the lower edge of the said insert hole 11. As a result the cassette holder 2 is opened by means of the spring 13, as shown in FIG. 2. Now the cassette is ready to be removed.

It is pointed out, however, that known opening and closing device for a cassette holder as discussed above has drawbacks. The cassette holder is very quickly opened with accompanying shock due to the arrangement that the cassette holder 2 is opened with the aid of spring force of the spring 13. Shock noises are generated during opening operation of the cassette holder 2. Also, the opening operation is performed without the desired sensitivity control. In order to eliminate the above-described drawbacks, it is conceivable to reduce the spring force for opening the cassette holder. With the device constructed in this way, however, another drawback is that the cassette holder fails to ensure sufficiently high opening force. Further due to the arrangement that the spring 13 for opening the cassette holder 2 and the spring 14 serving to hold the cassette holder 2 in the closed state are separately provided, the known device has a drawback that it requires additional component parts. Moreover because it is difficult to set the spring force of the springs 13 and 14 to the required magnitude, another drawback is that the cassette holder fails to be smoothly opened and closed, when the spring force is not in appropriate relative magnitude.

SUMMARY OF THE INVENTION

It is a main object of the present invention to provide an opening and closing device for a cassette holder or the like mounted in a cassette tape recorder, which is adapted to damp any shock caused during opening operation of the cassette holder or the like and at the same time to prevent occurance of unpleasant shock noise.

It is another object of the present invention to provide an opening and closing device for cassette holder or the like, which is constructed in a simple manner, in which the cassette holder or the like is gently opened and closed.

It is another object of the present invention to provide an opening and closing device for a cassette holder or the like, in which the opening and closing speed thereof can be adjusted so that the cassette holder or the like is smoothly opened and closed.

It is still another object of the present invention to provide an opening and closing device for a cassette holder or the like, in which opening and closing operations can be reliably carried out.

To accomplish the objects of the present invention, there is proposed in accordance with the present invention an opening and closing device for a cassette holder or the like, which comprises cooperating members in cooperation with an object to be opened and closed, a locking member for locking the cooperating members in the closed state of the object and a rotative member for exerting damping effect on the object during opening and closing operation thereof by way of following the movement of the cooperating members.

In the opening and closing device for cassette holder or the like in accordance with the present invention there is arranged an actuating means between the cooperating members and the locking member, which serves to actuate the cooperating member in such a direction as to open the object and at the same time actuate the locking member in such a direction as to lock the same.

Further the actuating means is preferably constructed such that the actuating force thereof can be adjusted as required.

Further in accordance with the present invention there is provided a pusher member for the cooperating member in cooperation with the ejecting lever for the object to be opened and closed, which is adapted to displace the cooperating members in contact therewith in such a direction as to open the object to be opened and closed.

Other objects and advantageous features of the invention will be available from the description and claims.

BRIEF DESCRIPTION OF THE DRAWINGS

The nature and characteristic features of the invention will be more readily understood from the following description taken in connection with the accompanying drawings forming part thereof in which.

DETAILED DESCRIPTION OF A PREFERRED EMBODIMENT OF THE INVENTION

Figure 6:
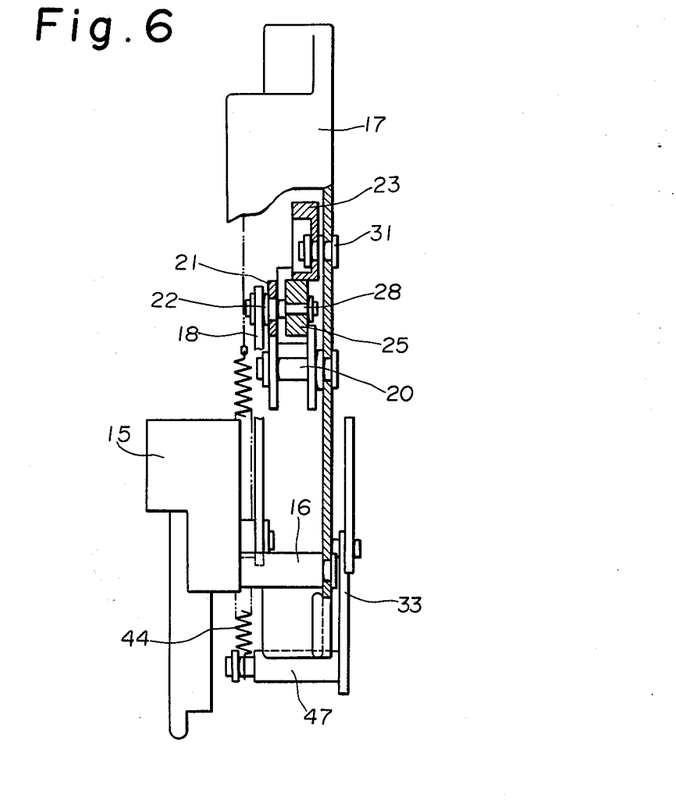
FIG. 6 is a partially sectioned front view of the embodiment in FIG. 3, in which the cassette holder is closed, wherein a part thereof is eliminated from illustration.
Figure 7:
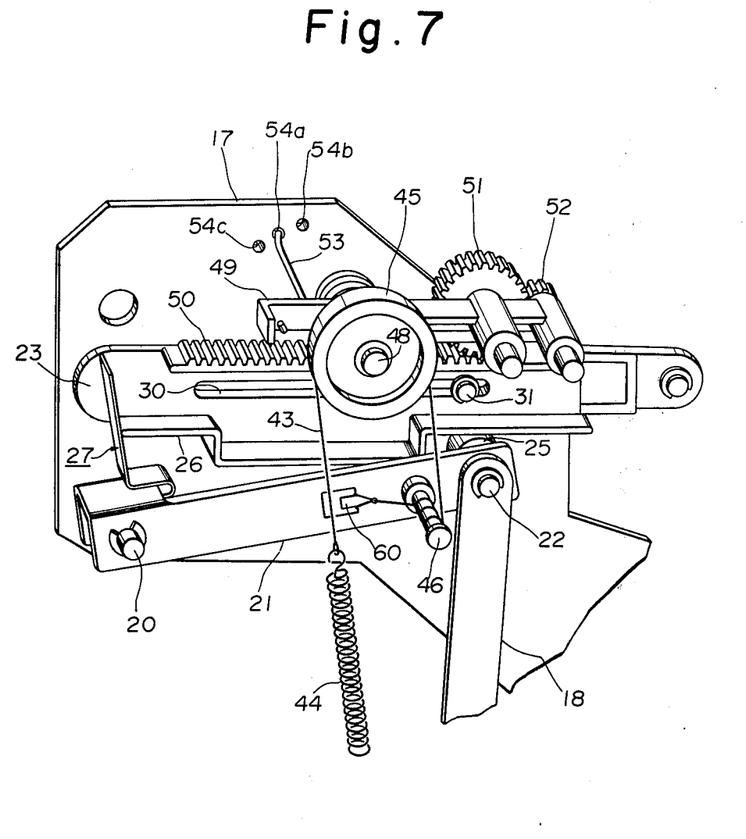
FIG. 7 is a perspective view showing a damping mechanism of the embodiment shown in FIG. 3, wherein a part thereof is also eliminated from illustration.
Figures 8, 9, 10:
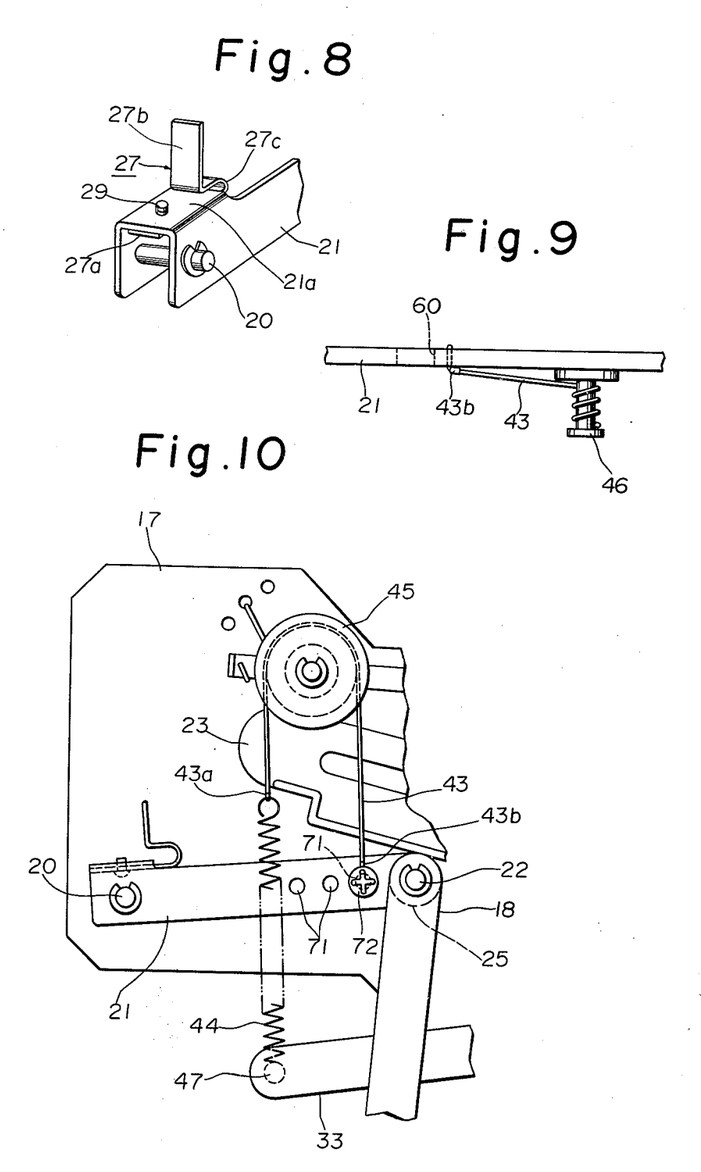
FIG. 8 is a perspective view of a pusher member for the embodiment in FIG. 3, as mounted thereon.
FIG. 9 is a plan view of a string means for the embodiment in FIG. 3, as wound thereabout.
FIG. 10 is a front view of a part of the device in FIG. 3 with the string means arranged thereon in a modified manner.

Now the present invention will be described in more details particularly with reference to FIGS. 3 to 9 of the accompanying drawings. As shown in FIG. 3 to 7, the reference numeral 15 denotes an ejection lever, on the lower portion of an operating part 15a thereof there is provided an actuating part 15b in the form of downwardly bent configuration connected thereto, while the lower end of the operating part 15a is freely rotatably supported on fixed pin 16. It is to be noted that the fixed pin 16 is secured to a mounting plate 17 disposed in the opening and closing device of this embodiment and, that other "fixed" pins to be explained later are also secured to the mounting plate 17. A lower end of a link 18 is rotatably connected to the bent portion of the operating part 15b of the ejecting lever 15 with the aid of pin 19, while the upper end of the link 18 is also rotatably connected to the outer right end of an arm 21 with the aid of pin 22, the arm 21 being rotatably arranged on a fixed pin 20 at its left end. On the arm 21 there is mounted a roller 25 which is arranged in rotatable contact with the lower surface 23a of a lever 23 to be explained later and, which is engageable with an engaging part 24 of the lower surface 23a. Further on the left upper portion of the arm 21 there is provided a pusher member 27 which comes in contact with the rear end of a horizontally extending rim 26 along the lower edge of the lever 23 so as to push the same in the right direction viewed in FIG. 3. As illustrated in FIG. 6, the roller 25 is rotatably mounted on a pin 28 which is arranged coaxially to the pin 22 on the right end of the arm 21, whereas as shown in FIG. 8, the pusher member 27 is securely mounted at its base 27a on the left upper portion of the arm 21 with the aid of screw 29, the arm 21 being shaped in the form of inverted U profile. It is to be noted that the pusher member 27 is manufactured in a form of plate spring with a curved part 27c between the base 27a and operating part 27b, so that the operating part 27b operates resiliently against the rear end of the horizontally extending rim 26 of the lever 23. The lever 23 is supported slidably on a fixed pin 31 along an elongated hole 30 which is longitudinally formed in the lever 23, the right end of the lever 23 being rotatably connected to a position in the vicinity of the top end of a first holding lever 33 by means of a pin 34, which serves to hold a cassette holder 32 to be opened at its top end. As shown in the drawings, the first holding lever 33 has a leftward bent configuration and the bent portion thereof is held rotatably about a fixed pin 35, while the top end thereof is engaged to the cassette holder 32 slidably along a guide groove 37 formed on the upper side surface of the cassette holder 32 with the aid of a pin 36 secured thereto. Further the first holding lever 33 is provided with a pin 38 in a position in the vicinity of the top end thereof, which is fit slidably in an elongated hole 40 formed in a second holding lever 39 which serves to hold the cassette holder 32. The second holding lever 39 is rotatably connected to a fixed pin 41 at its top end, while being also rotatably connected to the lower portion of the cassette holder 32 by means of a pin 42 at its lower end. It should be noted that there is provided a coil spring 44 between the right end of the arm 21 and the lower end of the first holding lever 33 with a string means 43 interposed therebetween. Particularly the lower end of the coil spring 44 is connected to a pin 47 secured to the lower end of the first holding lever 33, while the upper end of the coil spring 44 is bound about one end of the string means 43. The string means 43 is wound around a pulley 45 arranged substantially above the lever 23 at its middle in such a manner as to urge the arm 21 and the first holding lever in the predetermined direction and then wound about a pin roller 46 secured to the right end part of the arm 21 in the vicinity of the other end 43b of the string means. As illustrated in FIG. 9, the other end 43b is fastened to a protrusion 60 in the middle part of the arm 21. It is to be noted that the length of the string means 43 is selected in a suitable manner so that the coil spring 44 is tensioned as required and that the tension of the coil spring 44, that is, actuating force exerted on the first holding lever 33 by the coil spring 44 in the clockwise direction or another actuating force exerted on the arm 21 in the counterclockwise direction can be adjusted by way of increasing or decreasing the number of turns of winding of the string means 43 about the pin roller 46.

Thus the arm 21 is always actuated by means of the coil spring 44 to be rotated about the fixed pin 20 as a center always in the counterclockwise direction, while the first holding lever 33 is actuated by the same 44 to be rotated about the fixed pin 35 as a center of rotation always in the clockwise direction. This causes the roller 25 to be displaced in pressure contact with the lower surface 23a of the lever 23 so that the cassette holder 32 is resiliently biased in such a direction as to be opened. Incidentally the pulley 45 is rotatably held on the top end of a stationary shaft 48 which is incorporated in the mounting plate 17.

Additionally the lever 23 is provided with a damping mechanism which serves to exert damping effect on opening and closing operations of the cassette holder 32. As illustrated in FIG. 3 to FIG. 5 and FIG. 7, a support lever 49 is rotatably arranged at the base portion of the fixed shaft 48, extending rightwards therefrom to carry a pinion 51 and a gear 52 at the right part of the lever 49, the pinion 51 being in engagement with a rack 50 generated along the upper portion of the lever 23 and further the gear 52 being in engagement with the pinion 51 in such a manner as to exert the predetermined magnitude of rotating resistance against it. The support lever 49 is adapted to be rotatively actuated by means of torsion spring 53 in the clockwise direction so that the pinion 51 is always depressed to be in engagement with the rack 50. The torsion spring 53 is mounted on the bearing part 49a of the support lever 49, making several turns of winding thereabout, wherein one end thereof is locked at a hole 54a drilled in the mounting plate 17, while the other end thereof is locked at a protrusion 55 at the rear end of the support lever 49.

Further there are formed in the mounting plate 17 other holes 54b and 54c at certain distance from the hole 54a so as to adjust the actuating force of the torsion spring 53 acting on the support lever 49 by way of displacing the locking position of the end 53a thereof from 54a to 54b or 54c. The pinion 51 is fastened to a rotating shaft 56 which is journaled on the bearing 49b of the support shaft 49, while the gear 52 is supported on a rotating shaft 57 which is journaled on the bearing part 49c. To ensure smooth but appropriately resistive rotation, the clearances between the bearing parts 49b, 49c and the rotating shafts 56, 57 are filled with high viscous lubricant such as grease respectively.

Figure 3:
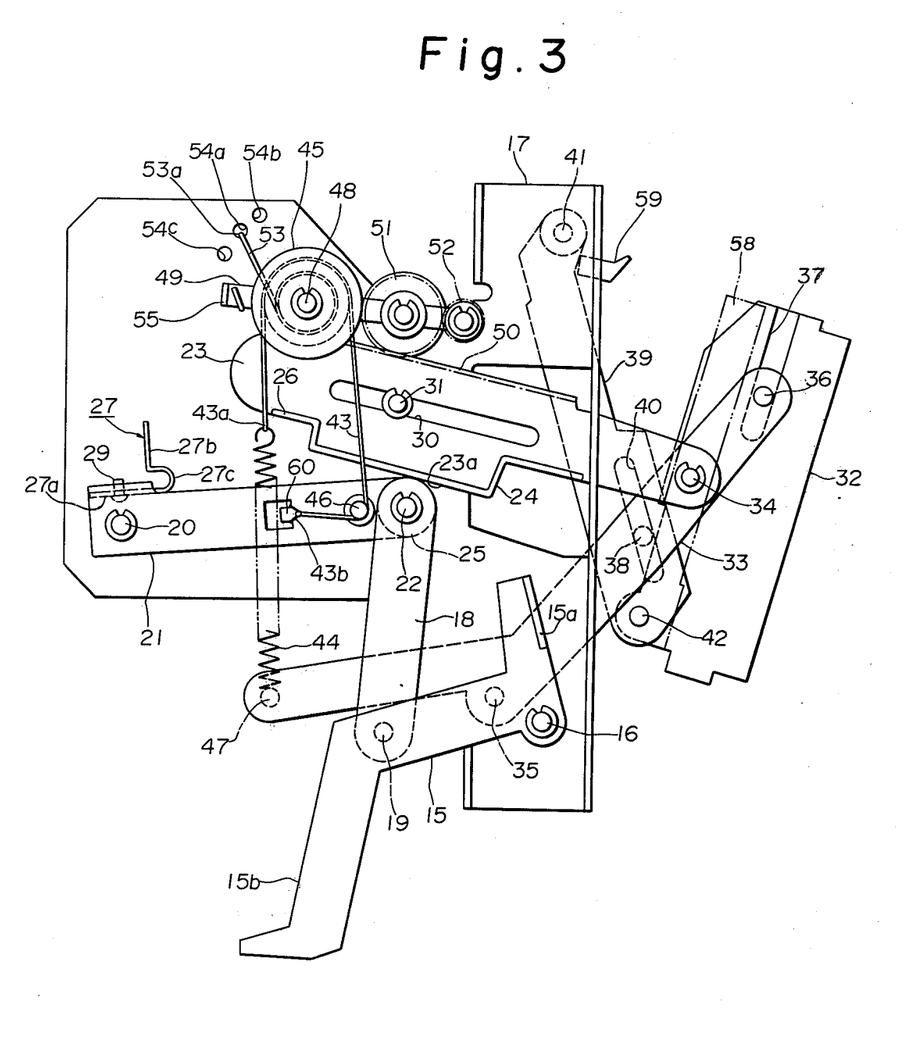
FIG. 3 is a side view of an embodiment of the invention, in which a cassette holder is kept in an opend position.
Figure 4:
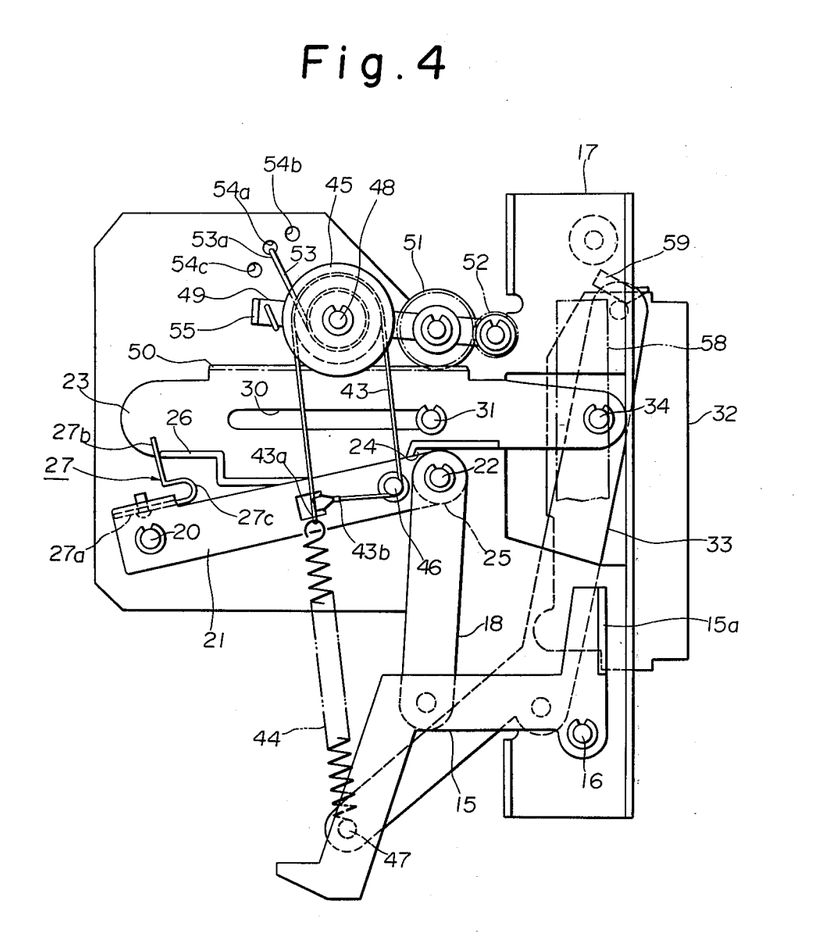
FIG. 4 is a side view of the embodiment of the invention in FIG. 3, in which the cassette holder is kept in a closed position.
Figure 5:
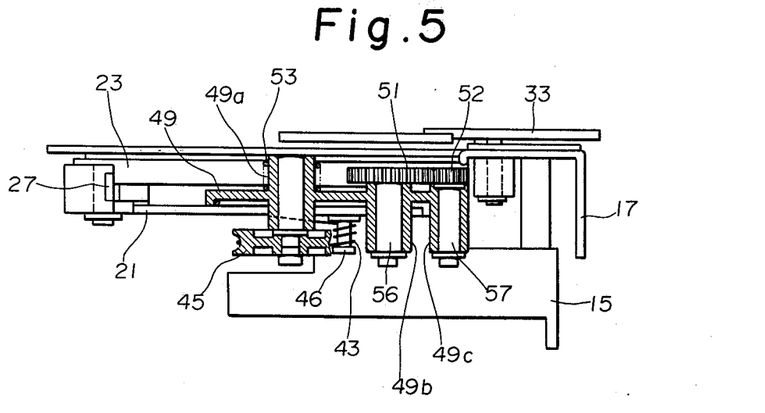
FIG. 5 is a partial sectional plan view of the embodiment of the invention in FIG. 3, in which the cassette holder is closed, wherein a portion thereof is eliminated for simplification of illustration.

In FIGS. 3 and 4 the reference numeral 58 denotes a cassette to be held, and the reference numeral 59 denotes a locking ratchet which is disposed to be in engagement with the cassette 58 contained in the cassette holder 32, when the same is closed, so that the cassette 58 is kept fixed therein.

Now operation of the cassette holder in accordance with the present invention will be described below.

FIG. 3 illustrates the cassette holder 32 in an opened state. When it is desired to load the cassette 58 in the cassette holder 32, first the cassette holder 32 is pushed rearwards (in the leftward direction as seen in FIG. 3), after inserting the cassette 58 in the cassette holder 32. Then the first holding lever 33 is rotated around the fixed pin 35 against the coil spring 44 in the counterclockwise direction, causing the pin 38 of the first holding lever 33 to be displaced along the elongated hole 40 so that the second holding lever 39 is rotated in the clockwise direction and at the same time the lever 23 fastened to the pin 34 of the first holding lever 33 is displaced rearwards, while being guided by the fixed pin 31 along the elongated hole 30.

In this connection, owing to the arrangement of the rack 50 on the lever 23 in pressure engagement with the pinion 51, the pinion 51 and the gear 52 in engagement therewith are rotated, as the lever 23 is displaced. It is to be noted that the frictional force due to pressure engagement of the rack 50 to the pinion 51 and the rotative resistance between the pinion 51 and gear 52, that is, the viscous resistance of the high viscous liquid filled in the clearance between the bearings 49b and 49c and the rotating shafts 56 and 57 serve to provide damping effect for the lever 23, resulting in gentle displacement of the cassette holder 32. As the lever 23 is displaced in the rearward direction, the roller 25 mounted on the lever 23 is moved, rolling along the lower surface 23a of the lever 23, till it comes in engagement with the stepped portion 24 of the lever 23. It is to be noted that at this moment the coil spring 44 is tightly tensioned by way of rotative movement of the first holding lever 33 so that it is ensured that the roller 25 is in engagement with the portion 24 due to the spring force exerted on the arm 21 by means of the coil spring 44 and string means 43. In this moment the rear end of the horizontally extending rim 26 of the lever 23 comes in pressure contact with the operating part 27b of the pusher member 27 mounted on the left end of the arm 21. When the roller 25 comes in engagement with the stepped portion 24, the cassette holder 32 has been closed as illustrated in FIG. 4 so that an operator is ready to start playing, as the cassette 58 is engaged and locked by the locking ratchet 59. Due to the fact that the roller 25 is in engagement with the stepped portion 24, as illustrated in FIG. 4, the lever 23 can be no more displaced forwards. Further the first holding lever 33 connected to the link 18 is kept immovable without any rotation by the spring force of the coil spring 44 so that the cassette holder 32 continues to be retained in the closed state.

Next, when it is desired to open the cassette holder 32 in the closed state as illustrated in FIG. 4 to remove the cassette 58, an ejecting button (not shown here) is depressed to actuate the operating part 15a of the ejecting lever 15 to rotate the same in the counterclockwise direction. Now the link 18 is lowered so that the arm 21 is rotated against the spring force of the coil spring 44 in the clockwise direction. At this moment the pusher member 27 is resiliently deformed in the counterclockwise direction relative to the arm 21, because the operating part 27b of the pusher member 27 is prevented from rotation in the clockwise direction due to the engagement of the operating part 27b against the rear end of the horizontally extending rim 26 of the lever 23, till the roller 25 is disengaged from the stepped portion 24 of the lever 23. Thus the pushing force of the pusher member 27 against the horizontally extending rim 26 is increasingly accumulated.

When the roller 25 is released from the engagement to the stepped portion 24, the operating part 27b of the pusher member 27 operates to displace the lever 23 forwards so as to exert on the first holding lever 33 an initial rotative force in the clockwise direction. Further the coil spring 44 exerts a high initial rotative force on the first holding lever 33 in cooperation with the pusher member 27, because it has been tightly tensioned during rotative movement of the lever 21. As a result the first holding lever 33 displaces the cassette holder 32 forwards so that the cassette 58 is disengaged from the locking ratchet 59. Subsequent to the aforesaid operation, the first holding lever 33 is rotated in the clockwise direction with the aid of the coil spring 44, causing the cassette holder 32 to be opened as illustrated in FIG. 3. Now the cassette 58 is ready to be removed therefrom. In this connection it is to be noted that owing to the damping effect brought about by the frictional force due to pressure contact between the rack 50 and pinion 51 and the rotative resistance of the pinion 51 and gear 52, the cassette holder 32 is gently opened in the same manner as in case of closing the holder 32.

If, during the above-mentioned opening and closing operations for the cassette holder, the cassette holder fails to be opened at the desirable speed, the optimum operating conditions are assured by way of adjustment of actuating force exerted on the first holding lever 33 by the coil spring 44. Namely, the adjustment of the actuating force exerted on the first holding lever 33 by the coil spring 44 can be effected in such a manner as to change the number of turns of winding of the string means 43 about the pin roller 46 to adjust the tension of the coil spring 44 (See FIG. 9).

Incidentally, as a damping means for the cassette holder 32 during opening and closing operation there is provided in the above-described and illustrated embodiment of the present invention the arrangement that the rack generated along the upper surface of the lever 23 is adapted to be in engagement with the pinion 51. As an alternative, however, there may be provided an arrangement that a rotative member with high frictional coefficient such as rubber roller is engaged to the upper surface of the lever 23, wherein the upper surface is flattened or milled. Further the pinion 51 may be in engagement with a gear train in order to enhance the damping effect, although the pinion 51 is in engagement with a single gear 52 in the embodiment as described above.

In the above-mentioned embodiment of the invention there is provided the arrangement in which the string means 43 is wound about the pin roller 46 so as to act as a means for adjusting the actuating force of the coil spring 44 and adjustment is effected by way of changing the number of turns of winding of the string means on the pin roller. However, in place of the arrangement in the embodiment of the invention, adjustment of the actuating force of the coil spring 44 may be effected in such a manner that there are formed a plurality of screw holes 71 at a certain distance therebetween in the longitudinal direction of the arm 21, as shown in FIG. 10, and a set screw 72 is inserted in either of the screw holes 71, to which one end 43b of the string means 43 is connected, so that one of the screw holes 71 is selected to look for the optimum position for the end 43b of the string means 43 to be fastened.

Further in the above-mentioned embodiment of the present invention, there is provided a plate spring for the pusher member 27. The present invention is by no means limited only within such an arrangement for the pusher member. For instance the pusher means may be constructed of a resilient member of rubber or the like. Furthermore the pusher member 27 may be so arranged as to contact a pin fastened to the lever 23, instead of directly contacting the end portion of the horizontally extending rim 26 of the lever 23 in the above-mentioned embodiment of the invention.

An object to be opened and closed is described in a form of cassette holder in the aforesaid embodiment. The present invention, however, should not be limited only within the said description. It may be a lid, cover or the like to be mounted on a cassette tape recorder.

As being obvious from the above description, the device in accordance with the present invention has advantages that owing to the arrangement of a rotative body in cooperation with the lever in linkage motion with the body to be opened and closed such as cassette holder or the like, shocks caused by movement of the object to be opened and closed can be substantially reduced and damped and at the same time shock noise can be minimized with very excellent feeling of operation.

Further, owing to the arrangement that an actuating means for opening the object to be opened and closed such as cassette holder is adapted to operate also as an actuating means for locking the object in the closed state, the device can be constructed in a more simple structure in accordance with the present invention. Moreover, the device according to the present invention has an advantage that the actuating means works smoothly during the opening and closing operation thereof, owing to the foregoing arrangement, and the device can be smoothly and reliably opened and closed.

Further owing to the arrangement that actuating force of the said actuating means is adjustable, the device according to the present invention has another advantage that the object to be opened and closed can be operated by adjusting an operating speed so as to meet the operator's requirement, so that the adjustment is effected in such a manner as to ensure an excellent operation feeling during opening and closing the device.

Furthermore owing to the arrangement that initial opening force is augmented by means of the pusher member, the device according to the present invention has still another advantage that a spring with weak resilient force for operating the said body can be incorporated, resulting in reduction or elimination of shock noise generated at the end of opening operation of the object.

It should, of course, be understood that the description and illustration of the embodiment and modified embodiments as mentioned above are merely illustrative and further modifications and changes may be made without any departure from the spirit of the present invention.

What is claimed is:

1. An opening and closing device mounted in a cassette tape recorder comprising an object to be opened and closed which is movable between opening and closing positions, a supporting member for movably supporting said object, a cooperating member movable in accordance with the movement of said object, a locking member for releasably locking said cooperating member in such a position that said object is kept closed, and a resistively movable body which is driven by said cooperating member to exert a damping effect on the movement of said cooperating member thereby damping the movement of said object at least when released from said locking member, said resistively movable body comprising a pinion in engagement with a rack formed on said cooperating member.

2. The invention in accordance with claim 1 wherein said pinion is further in engagement with a gear rotatably supported on said support lever so as to provide a predetermined magnitude of rotative resistance for said pinion.

3. An opening and closing device mounted in a cassette tape recorder comprising an object to be opened and closed which is movable between opening and closing positions, a supporting member for movably supporting said object, a cooperating member movable in accordance with the movement of said object, a locking member for releasably locking said cooperating member in such a position that said object is kept closed, and a resistively movable body which is driven by said cooperating member to exert a damping effect on the movement of said cooperating member thereby damping the movement of said object at least when released from said locking member, the said resistively movable body being disposed on a support lever which is biased by a first biasing member toward said cooperating member thereby urging said resistively movable body to be in pressure contact with said cooperating member, said first biasing member being a spring, one end thereof being fastened to a mounting plate and the other end thereof being connected to said support lever, so that the biasing force thereof can be adjusted by way of displacing a position where said one end of the spring is fastened to the mounting plate.

4. An opening and closing device mounted in a cassette tape recorder comprising an object to be opened and closed which is movable between opening and closing positions, a supporting member for movably supporting said object, a cooperating member movable in accordance with the movement of said object, a locking member for releasably locking said cooperating member in such a position that said object is kept closed, and a resistively movable body which is driven by said cooperating member to exert a damping effect on the movement of said cooperating member thereby damping the movement of said object at least when released from said locking member, a second biasing member being provided between said locking member and another cooperating member movable in accordance with the movement of said object, said second biasing member biasing said another cooperating member in a direction to open said object and said locking member in a direction to perform its locking operation, said second biasing member being a coil spring, said second biasing member being arranged between said another cooperating member and said locking member through the intermediary of a string member.

5. The invention in accordance with claim 4 wherein the middle part of said string member is wound around a pulley so that said another cooperating member and said locking member are biased in said respective directions.

6. The invention in accordance with claim 4 wherein the biasing force of said second biasing member is adjustable.

7. The invention in accordance with claim 6 wherein the middle part of said string member is wound around a winder provided in a path of said string member so that the biasing force of said second biasing member is adjusted by changing the number of turns of winding of said string member around said winder.

8. The invention in accordance with claim 6 wherein said string member has one end fixed on said second biasing member and the other end fixed on a position of said locking member and the biasing force of said second biasing member is adjusted by changing the fixing position of said string member on said locking member.

9. The invention in accordance with claim 1 wherein said resistively movable body comprising a rotative member supported around a shaft and viscous material filled between said rotative member and shaft.

10. The invention in accordance with claim 1 wherein a second biasing member is provided between said locking member and another cooperating member movable in accordance with the movement of said object, said second biasing member biasing said another cooperating member in a direction to open said object and said locking member in a direction to perform its locking operation.

11. The invention in accordance with claim 10 wherein said second biasing member is a coil spring.

12. The invention in accordance with claim 1 wherein said locking member is provided with a resilient pusher member which comes in contact with said cooperating member when said object is closed so that said cooperating member is biased in a direction to open said object by said pusher member.

13. The invention in accordance with claim 12 wherein said pusher member is a leaf spring.

14. An opening and closing device mounted in a cassette tape recorder comprising an object to be opened and closed which is movable between opening and closing positions, a supporting member for movably supporting said object, a cooperating member movable in accordance with the movement of said object, a locking member for releasably locking said cooperating member in such a position that said object is kept closed, and a resistively movable body which is driven by said cooperating member to exert a damping effect on the movement of said cooperating member thereby damping the movement of said object at least when released from said locking member, said resistively movable body comprising a pinion in engagement with a rack formed on said cooperating member, the resistively movable body being disposed on a support lever which is biased by a first biasing member toward said cooperating member thereby urging said resistively movable body to be in pressure contact with said cooperating member.

* * * * *